Patented Sept. 12, 1939

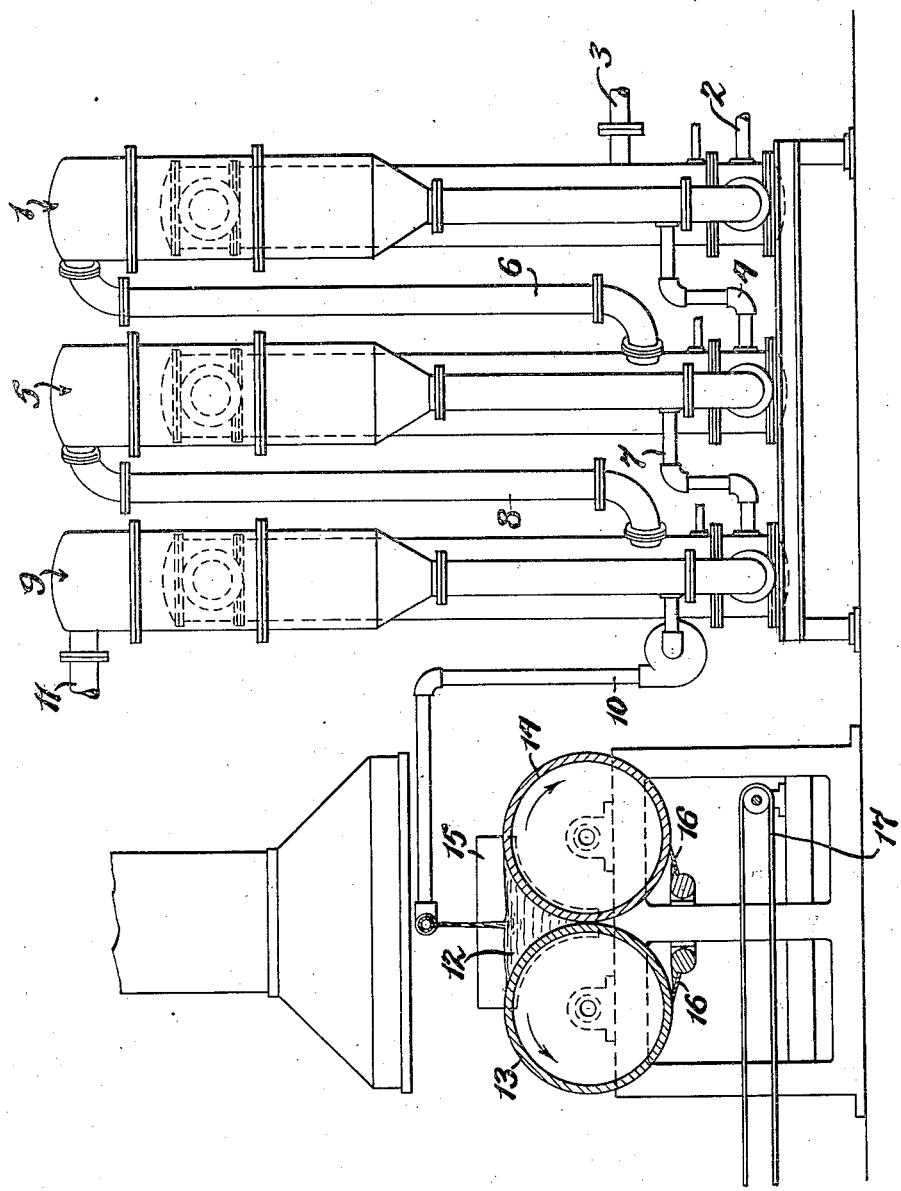

2,172,393

UNITED STATES PATENT OFFICE 2,172,393

PROCESS FOR DRYING WHEY

Charles O. Lavett, Buffalo, N. Y., assignor to Buffalo Foundry & Machine Co., Buffalo, N. Y., a corporation of New York Application October 15, 1935, Serial No. 45,090

7 Claims. (Cl. 99—57)

This invention relates to a process for drying whey and more particularly to the drying of whey under such conditions of time and temperature that the lactose is crystallized in stable form principally in the form of the alpha hydrate.

Whey is the residue which is left after fat and casein have been removed from the whole milk in the manufacture of cheese, or after casein has been removed from skim milk in the manufacture of casein or cottage cheese. While the composition of whey varies, depending upon the processing of the milk, it always consists largely of water, the solids being generally about 60–75% of lactose or milk sugar and about 25–40% of albumin and mineral salts. In addition, whey contains a small amount of acid, the percentage and nature of which varies with the process used. This may be lactic acid produced by the fermentation of the milk, or hydrochloric, sulfuric or acetic acid which has been added to coagulate the casein in the milk. In the raw whey, the lactose is in both alpha and beta form, an equilibrium existing between the two forms varying from 61.3% beta to 38.7% alpha lactose at 77° F. to 57.1% beta to 42.9% alpha lactose at 212° F.

The raw whey contains only about 6% solids, and in order to produce 100 lbs. of dry whey solids it is necessary to remove 1570 lbs. of water, more or less. Because of this low yield and the comparatively low market price of the dried whey, it is apparent that it is of the utmost importance that the production cost be reduced to the very minimum.

Where reference is made herein to amounts of materials, the percentage is based upon weight.

In one process now in commercial use the whey is concentrated in vacuum pans at low temperature to about 70% solids. The concentrated liquid is then allowed to cool and crystallize and is then loaded on trays and dried in a tunnel type dryer by passing heated air at about 130° F. over the product for about 20 hours or more. The dry product is then removed from the trays and ground to any desired degree of fineness. Obviously, much labor is involved in loading and unloading trays. Also the dryer itself occupies a great deal of space; consumes a great deal of heat and power and the process is a batch process requiring a great deal of time.

It is the object of the present invention to provide a low cost process for drying whey which can be carried out with relatively inexpensive and compact equipment and which produces a stable, undiscolored dry product composed principally of lactose crystals in the alpha hydrate form.

In the accompanying drawing the figure is a diagrammatic representation of the multiple effect evaporator and the double drum dryer used in carrying out my process.

To carry out such a process operating continuously and at low cost I favored the use of a double drum dryer, because such dryers are comparatively low in cost, take up a small amount of space, can be readily erected in existing creameries, require the minimum amount of steam for heating and drying, are low in power consumption and simple in operation, thereby permitting of ordinary labor supervision. Further, the operation of a drum dryer is continuous, operating costs are low and the material is converted from the liquid to the dry state in a very short period of time.

The milk sugar in the raw whey exists in two forms, the alpha and beta lactose. The alpha hydrate crystallizes from milk sugar solutions at temperatures below 93° C. (199.4° F.) and is the ordinary milk sugar of commerce. It contains one molecule or 5% water of crystallization which it retains even when heated at 212° F. The beta anhydride crystallizes above 199.4° F. and can be obtained by reducing milk sugar solutions above this temperature. It does not contain any water of crystallization and has a higher initial solubility than the alpha hydrate. Both forms are crystalline, non-hygroscopic and have good wetting properties. However, with very rapid drying of whey to a low moisture content the dry product contains both alpha and beta lactose in practically the same proportions as in the whey before being dried, and is extremely hygroscopic.

As an initial step in drying whey it is desirable to preheat the solution to coagulate the proteins. With whey from different sources it may also be desirable to adjust the acidity before concentration in order to obtain a product of light color.

In carrying out my invention the whey in the natural state or partly neutralized, is first concentrated in a multiple effect vacuum evaporator, although it will be understood that any other apparatus can be used, the multiple effect evaporator shown being preferred to preserve the light color of the whey and also for economy because it permits the maximum amount of water to be evaporated with the minimum amount of steam and because the flow of material is continuous. In this multiple effect evaporator the whey is concentrated to 40–50% solids. In the multiple effect evaporator shown, the whey is admitted to the first effect 1 at 2 and the steam at 3. From the first effect, the concentrated material passes through a line 4 to the second effect 5 and the vapors pass through a line 6 to heat the materials in the second effect. Similarly the further concentrated materials from the second effect pass through a line 7 and the vapors through a line 8 to the third effect 9. From the third effect the liquor is pumped through a line 10 and the vapors through an outlet 11 which is connected with a steam ejector and barometric condenser (not shown) or the like so that evaporation in the several effects takes place at reduced pressure. Preferably a vacuum of 25 or 26 inches is maintained in the last effect 9 to save steam and water and to preserve the light color of the product.

With a vacuum evaporator it is possible to raise the concentration to 65-70% solids, but it is not advantageous to do so because this can only be accomplished in separate batches in a single effect vacuum pan, whereas whey can be continuously passed through the multiple effect evaporator shown and a 40-50% concentration obtained. Concentration to 65-70% solids also offers various other difficulties, the heating surface coating badly; the evaporation being slow because of the high viscosity of the liquid thereby requiring large heating surface and close supervision of the operation being essential. At a concentration of 40-50% solids, the liquid is smooth and flows freely without any sign of crystal formation and in accordance with the present invention, can be retained between the drums of the drum dryer for a short length of time to concentrate the whey without forming a paste, the hot drum surfaces passing through the liquid taking on a uniform, heavy film.

From the line 10 the whey, in liquid form at a concentration of 40-50% solids and preferably without cooling to any great extent, is deposited in the space or reservoir 12 between the heated drums 13 and 14 of a double drum dryer. This dryer has the usual end boards 15 for retaining a quantity of whey in the space or valley 12 and it will be particularly noted that the drums 13 and 14 rotate in the opposite direction as compared with the drums in the usual double drum dryer, i. e. the drums 13 and 14 move upwardly at their point of closest approach. The quantity of whey in the space or valley 12 is purposely fed at such low concentration (40-50% solids) so that it is maintained in a liquid state in this space. The quantity of liquid in space 12 is held for a time, which is sufficient to raise this liquid to the boiling point but not long enough to concentrate the liquid to such an extent that it becomes pasty. As the drums 13 and 14 rotate they pick up a heavy, thick layer of the boiling whey. All the material so adhering to the drum surfaces as they pass through the boiling whey in reservoir 12 is retained undisturbed on the drum surfaces and is not partly removed and accumulated before leaving this reservoir as is the case when the drums revolve in the opposite direction. The material adhering to the drum surfaces is quickly reduced to any desired moisture content which is governed by the density of the solution fed, the steam pressure and the speed of the drums. In the present process the layer is preferably dried to 8-15% of moisture, the drying period being from one to two minutes. The steam pressure in the drums is preferably maintained at from 30 to 40 lbs. gage and the temperature of the layer during the drying time is raised to 218°-220° F. The heavy layer of whey on the drums so reduced to have an 8-15% moisture content is readily stripped from the drums by doctor knives 16 and deposited on an endless belt conveyer 17.

The product thus obtained is a supersaturated product containing few or no lactose crystals due to the high temperature and rapid drying. The product can be cooled rapidly down to 199.4° F., the lactose transition point, and thereafter cooling is continued to permit alpha lactose hydrate crystals to form, the lactose in so forming drawing moisture for their formation from the moisture remaining (8-15%) in the dried product to furnish the necessary one molecule of water of crystallization. The product obtained after the moisture has been largely absorbed as water of crystallization by the lactose in alpha form does not become sticky on exposure to the atmosphere. The free moisture left in the dry product is therefore from 4.5 to 11.5%.

By thick or heavy layer as used above and in the following claims is meant a layer that could be applied if the drums were rotated in the opposite direction, the spacing of the drums being, of course, limited by the tendency of the material to fall through.

If it should be desirable to further reduce the moisture content of the product, this can be done very easily by any suitable means. The product thus composed largely of alpha hydrate crystals gives up its free moisture very readily.

It is also apparent that the whey can be dried on the drums 13 and 14 to less than 8% moisture, cooled and the dry product, which is amorphous and hygroscopic, be allowed to take up moisture, and crystallize in the form of alpha lactose hydrate. This, of course, follows one step of the procedure now used in the spray process previously referred to and is obviously disadvantageous as compared with leaving sufficient moisture in the product from the drums to supply the water of crystallization.

It will be apparent that the practice of the present invention involves essentially the matter of temperature and time and that the particular equipment used is selected primarily for reasons of economy of operation and practical advantages in saving floor space.

From the foregoing it is apparent that the present invention provides a low cost process for reducing whey to a dry stable form and thereby enables creameries and casein manufacturers to make a valuable food product from a material which is generally not merely a waste product but a waste product which is difficult to dispose of. While I have described specific apparatus for carrying out my process, other apparatus could be used and therefore the invention is not limited to the use of any particular apparatus or steps but is to be accorded the full range of equivalents comprehended by the following claims.

I claim as my invention:

1. The method of drying whey which consists in preconcentrating the whey to a solution having less than 65% solids, thereafter boiling a body of said solution for a short time, withdrawing small quantities of the boiling whey from said body while still liquid, maintaining said withdrawn whey at a temperature above the boiling point of said body for a short time to effect rapid concentration thereof to from 65 to 92% solids in from 1 to 2 minutes and rapidly cooling the same below 199.4° F.

2. The method of drying whey which consists in preconcentrating the whey to a solution having less than 65% solids, thereafter boiling a body of the preconcentrated whey under atmospheric conditions, withdrawing the boiling whey from said body while still liquid and in the form of a thick layer, maintaining the temperature of said layer above the boiling point of said body of whey for from 1 to 2 minutes to effect rapid drying of said layer to from 65 to 92% solids and thereafter rapidly cooling the layer below 199.4° F.

3. The method of drying whey which consists in preconcentrating the whey to a solution having less than 65% solids, heating the preconcentrated whey for a sufficient length of time to effect rapid concentration to from 65 to 92% solids in from 1 to 2 minutes and thereafter rapidly cooling the same below 199.4° F. to effect crystallization of the lactose in the form of the alpha hydrate.

4. The method of drying whey which consists in preconcentrating the whey to less than 65% solids, thereafter subjecting said preconcentrated whey to an intermediate concentration at a temperature at or about its boiling point to effect concentration to between 65 and 92% solids and thereafter rapidly cooling the whey to below 199.4° F. and effecting crystallization of the preponderance of the lactose content.

5. The method of drying whey which consists in preconcentrating the whey under vacuum to from 40–50% solids, thereafter subjecting said preconcentrated whey to an intermediate concentration under atmospheric conditions at a temperature at or about its boiling point to effect concentration to between 65 and 92% solids and thereafter rapidly cooling the whey to below 199.4° F. and effecting crystallization of the lactose content.

6. The method of drying whey which consists in preconcentrating the whey to from 40–65% solids, thereafter boiling a body of the preconcentrated whey under atmospheric conditions, withdrawing the boiling whey from said body while still liquid in the form of a thick layer, raising the temperature of said layer above 218° F. to reduce the moisture thereof to from 8 to 15% and thereafter rapidly cooling said layer to below 199.4° F.

7. The method of drying whey which consists in preconcentrating the whey under vacuum to from 40–50% solids, thereafter subjecting said preconcentrated whey to an intermediate concentration under atmospheric conditions at a temperature at or about its boiling point to effect concentration to between 65 and 92% solids, thereafter rapidly cooling the whey to approximately 199.4° F. and thereafter cooling and crystallizing the preponderance of the lactose content in the form of the alpha hydrate.

CHARLES O. LAVETT.